United States Patent [19]
Keen

[11] Patent Number: 6,044,480
[45] Date of Patent: Mar. 28, 2000

[54] MESSAGE GENERATION AND VERIFICATION FOR A COMMUNICATION NETWORK

[75] Inventor: Henry D. Keen, St. Paul, Minn.

[73] Assignee: NCR Corporation, Dayton, Ohio

[21] Appl. No.: 08/758,750

[22] Filed: Dec. 6, 1996

[51] Int. Cl.[7] .................................................. G01R 31/28
[52] U.S. Cl. .......................................... 714/715; 714/712
[58] Field of Search .................................. 371/20.4, 20.1, 371/22.1, 67; 395/200.67; 714/715, 712, 819

[56] References Cited

U.S. PATENT DOCUMENTS

| | | | |
|---|---|---|---|
| Re. 31,407 | 10/1983 | Furtman et al. ........................ | 364/200 |
| 4,166,290 | 8/1979 | Furtman et al. ........................ | 364/200 |
| 4,710,871 | 12/1987 | Belknap et al. .................... | 395/200.67 |
| 5,404,374 | 4/1995 | Mullins et al. .......................... | 375/200 |
| 5,809,083 | 9/1998 | Wright .................................... | 375/285 |

*Primary Examiner*—Phung M. Chung
*Attorney, Agent, or Firm*—Ying Tuo; Paul J. Maginot

[57] ABSTRACT

Methods and apparatuses are provided to check the order, continuity and correctness for the data segments in a test message received via a network by a terminal. The test message contains a non-repeating data pattern in which any small portion of a known length is sufficient to generate the remainder of the message. To check the order and continuity of a pair of data segments, the receiving terminal needs to check only the beginning portion of the trailing segment against the ending portion of the preceding segment, thus improving the efficiency.

16 Claims, 6 Drawing Sheets

$b_0, b_1, \cdots, b_m, b_{m+1}, \cdots, b_{2m}, b_{2m+1}, \cdots, b_{nm}, b_{nm+1}, \cdots$

MESSAGE GENERATION AND VERIFICATION FOR A COMMUNICATION NETWORK

BACKGROUND OF THE INVENTION

The present invention relates generally to verifying messages received from a communication network, and more particularly to verifying test messages transmitted by a transmitting terminal and received by a receiving terminal via a communication network.

It is known that a communication network, such a local area network (LAN) or a wide area network (WAN), can transmit data among the communication terminals connected to it. To test a communication network and the communication terminals that are connected to the communication network, heavy traffic loads (i.e., sufficient data traffic to approach the capacity limits of the network or terminals) must be placed on the communication network, because heavy traffic loads can reveal some characteristics and behaviors of the network which otherwise may not be discovered.

Test messages often contain meaningless data, included as padding to create messages of a desired length. Prior to transmitting a test message, a transmitting terminal may split the test message into many data segments, and then send them to a receiving terminal via the network being tested.

The receiving terminal receives the transmitted data segments, places them in proper sequence if necessary, and reassembles the messages in a storage device. Even though a computed value, such as cyclic redundancy check, may be attached to each individual segment to detect transmission error for the segment, the computed value is not able to detect any corruption or misordering of the received segments which takes place in the storage device. The network may also contain intermediate storage devices, within which the segments are similarly unprotected. Thus, the receiving terminal needs to verify the received segments, and to ensure all the segments of a message were delivered correctly and in order.

One conventional scheme to verify the received data segments is to set a predetermined data segment pattern by always sending the same message or message sequence. However, under this scheme, some particular message sequence or segment length, capable of causing errors, can be easily omitted.

Another conventional scheme to verify the received data segments is to send a message having a simple repeating pattern. However, such a simple pattern may repeat in such a way that parts of a message received can be misordered without detection.

Still another conventional scheme to verify the received data segments is to transmit a test message from a transmitting terminal to a receiving terminal, and re-transmit the test message from the receiving terminal back to the transmitting terminal. This scheme restricts the variety of traffic configurations tested, by requiring a balanced flow of traffic in both directions. A large volume of traffic flow in a single direction, with no comparable traffic flow in the reverse direction, often exhibits different behaviors in the communication network and the communication terminals connected to it.

Thus, there is a need to provide an improved method and apparatus that can detect various types of errors for a sequence of received message efficiently and effectively.

The present invention meets this need.

SUMMARY OF THE INVENTION

In one aspect, the invention provides a method for transmitting a message from a transmitting terminal to a receiving terminal. The method comprises the steps of:

generating the message containing a plurality of data units, where any of said data units is able to generate the remainder of the message; and transmitting the message.

In another aspect, the invention provides a method for receiving a message containing a plurality of segments, and for verifying the sequence of the plurality of segments. Each of the segments contains a plurality of data units. The method comprises the steps of:

receiving the message, where any of the data units is able to generate the remainder of the message; and verifying the sequence of a segment by checking only a portion of the segment.

In still another aspect, the invention provides a method for verifying a sequence of a message containing a plurality of segments. Each of the segments contains a plurality of data units. The method comprises the steps of:

generating the message where any of the data units is able to form the remainder of the message; and verifying the sequence of a segment by checking only a portion of the segment.

The present invention also provides respective apparatuses or systems corresponding to the above-mentioned three aspects.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the principles defined herein may be applied to other embodiments and applications without departing from the spirit and scope of the invention. Thus, the present invention is not intended to be limited to the embodiment shown, but is to be accorded with the broadest scope consistent with the principles and features disclosed herein.

In principle, a transmitting terminal of the present invention transmits a test message that contains a non-repeating sequence of self-defining unit values. The value of a trailing unit is generated based on the value of its immediate preceding unit (or its several immediate preceding units). The remainder of the message can be generated by recursive calculation.

For example, using an eight-bit byte (octet) as a basic unit, a sequence can be generated by a formula using any two successive byte values to determine the next byte. If the length of the entire message is known to the receiving terminal the first two bytes are sufficient to generate the rest of the message. The length may be known in different ways. One method is to convey it in a separate field, not a part of the self-defining data sequence, within the message itself. After reassembling the received message, the receiving terminal needs only to verify: (1) whether the message has the expected length, and (2) whether each byte after the first two bytes in the sequence matches the value calculated by the formula.

Based on the non-repeating characteristic of the sequence, a receiving terminal of the present invention can verify the segment order of the received message during the reassembling process without checking the entire contents of each segment. This is useful, and highly efficient, if segment loss or misordering is the type of error anticipated. The length of the portion that must be checked, in each segment, is the length of the portion used to generate more of the data sequence. In the example above, a receiving terminal needs to check only the first and second bytes of each segment. A pair of segments is in correct order, if:

(1) the first byte of the trailing segment matches the value generated from the last two bytes of the preceding segment, and (2) the second byte of the trailing segment matches the value generated from the last byte of the preceding segment and the first byte of the trailing segment.

Within the maximum length of a single message, the data sequence used may not repeat any portion long enough to generate the subsequent data. If it did repeat, a message might be segmented at a transmitting terminal and reassembled out of order at a receiving terminal without detecting the error. In particular, when the value of each eight-bit byte of a test message (except the first two bytes, which are pre-selected) is generated based on the values of the preceding two bytes, the longest possible test message would be 65,537 bytes. This limit could only be achieved if each possible permutation of two bytes appears once in the test message.

Thus, it is crucial to find a formula that can generate a test message with a sequence that has sufficient length without repetition. One specific formula that can be used to implement the present invention is:

$$b_{n+1} = b_{n-1} + \frac{b_n}{2} + 1$$

$$n = 1, 2, \ldots, L;$$

(n=1,2, . . . , L; L+1 is the total number of bytes in the test message; bi stands for the ith byte in the message), where the division discards any remainder and the addition is modulo 256. The is values of the first two bytes ($b_0$, $b_1$) in the sequence generated by formula (1) can be pre-selected as 0 and 1 respectively. The maximum length of a test message without repetitions generated by this formula is 59,213 bytes. Since this sequence is a closed cycle (meaning that, from any point of the sequence, it eventually repeats in its entirety), a test message of maximum length may begin at any point in the sequence without repetition.

Figure 1:
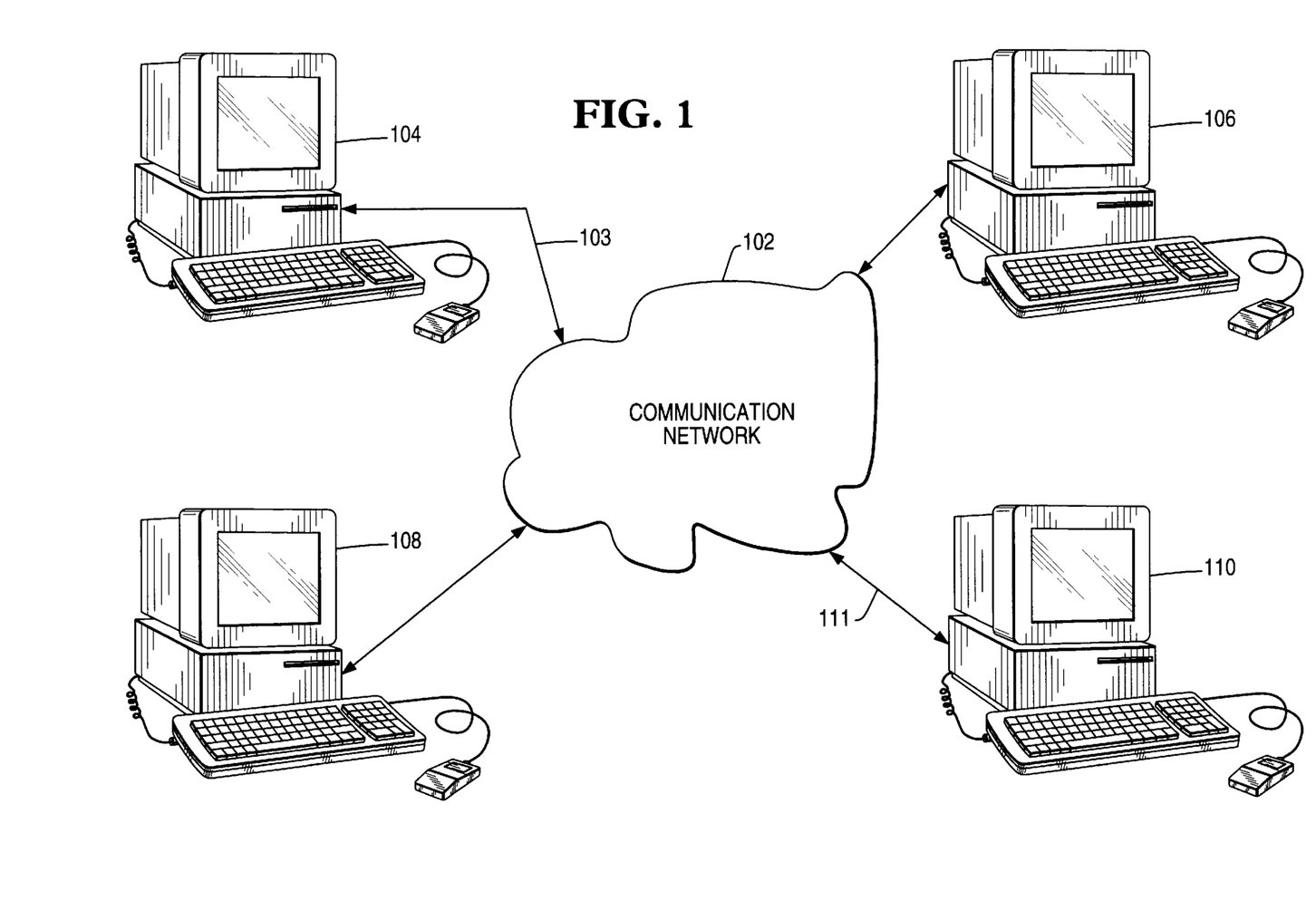
FIG. 1 is a communication network system that can be tested by the present invention.

Referring to FIG. 1, there is shown a communication network system 100, which can be tested by the present invention. As shown in FIG. 1, a plurality of communication terminals (104, 106, 108, 110) are coupled to communication network 102. Each of the communication terminals can transmit messages to, or receive messages from, communication network 102, in accordance with one or a set of network protocols.

Figure 2:
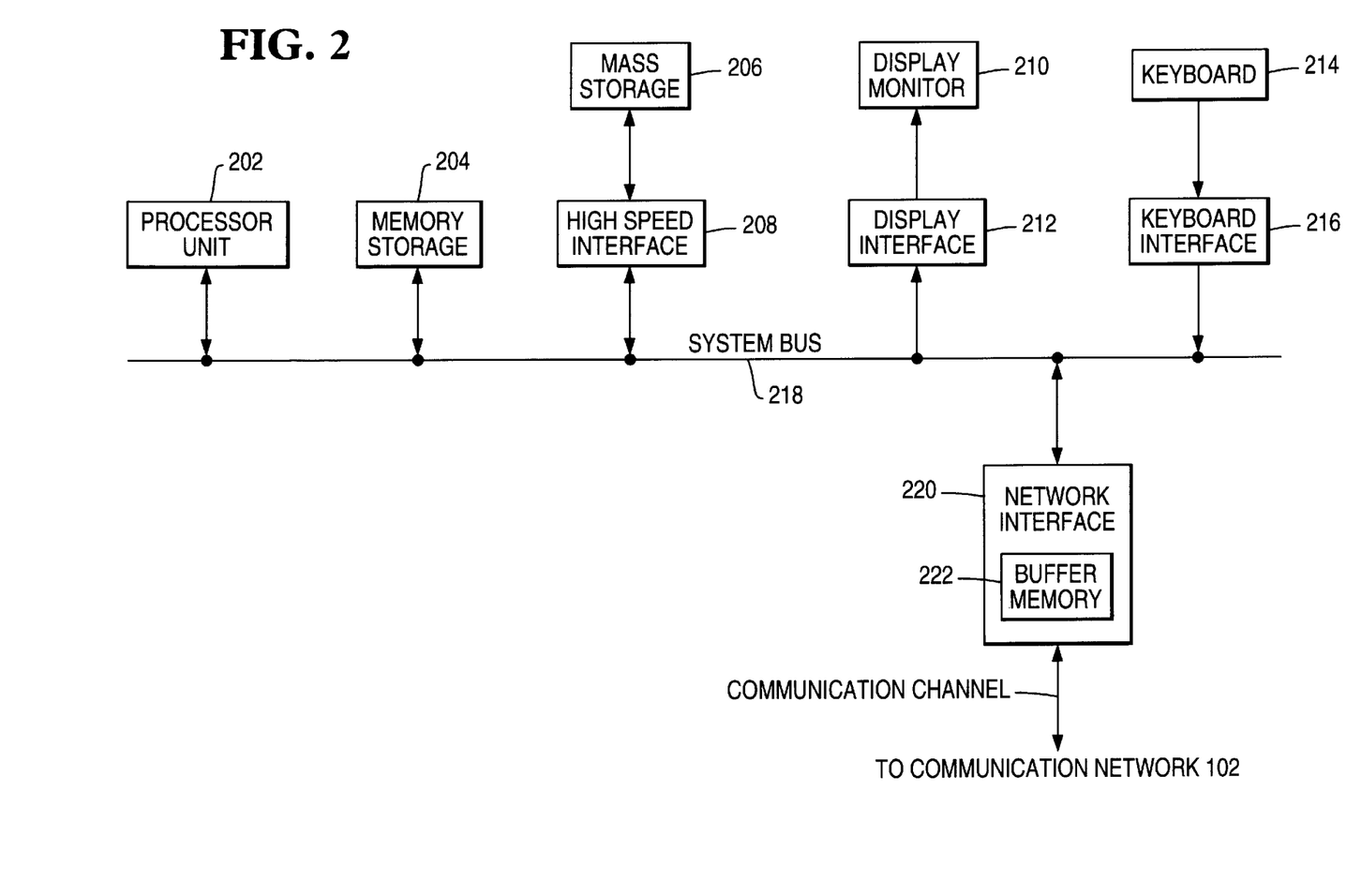
FIG. 2 is a block diagram of a communication terminal connected to the communication network shown in FIG. 1, which can be used as a transmitting or a receiving terminal in the present invention.

Referring to FIG. 2, there is shown a block diagram of a communication terminal (104, 106, 108, or 110) shown in FIG. 1.

As shown in FIG. 2, the communication terminal (which can be a personal computer or workstation) includes a system bus 218, a processor unit 202, a memory storage 204, a mass storage 206 (which can be a disk drive) coupled to the system bus via a high speed interface 208, a display monitor 210 coupled to the system bus via a display interface 212, a keyboard 214 coupled to the system bus via a keyboard interface 216, and a network interface 220 coupled between the system bus and communication network 102.

Memory storage 204 is able to store programs and data.

Like memory storage 204, mass storage 206 is also able to store programs and data. However, mass storage 206 has larger memory size than memory storage 204, while memory storage 204 has faster access speed than mass storage 206. The programs and data stored in mass storage 206 can be down loaded to memory storage 204.

Processor unit 202, coupled to the system bus, has access to both memory storage 204 and mass storage 206. To perform a specific task, the processor unit is able to execute the programs stored in memory storage 204. The processor unit is also able to control overall operation of the other function blocks of the communication terminal.

Display monitor 210 is able to provide a visual interface between a user and the programs that are being run on the communication terminal.

Keyboard 214 is able to provide inputs to the communication terminal.

Network interface 220 has a buffer memory 222 for storing the data to be received or to be transmitted. When acting as a transmitting terminal, network interface 220 is able to divide a test message into a plurality of segments and convert the segments in to the format that complies with the predetermined protocol(s) used by communication network 102. When acting as a receiving terminal, network interface 220 is able to reassemble data segments received from communication network 102.

Figure 3:
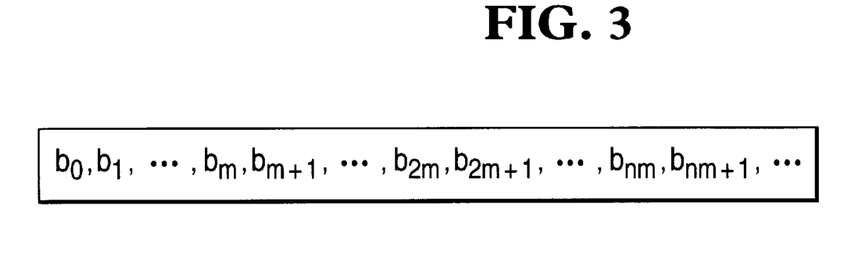
FIG. 3 is a sequence of a test message, which can be generated by a transmitting terminal, in accordance with the present invention.

Referring to FIG. 3, there is shown a test message containing a plurality of bytes ($b_0, b_1, \ldots, b_i, \ldots$) generated by a transmitting terminal according to formula (1) discussed above.

Figure 4:
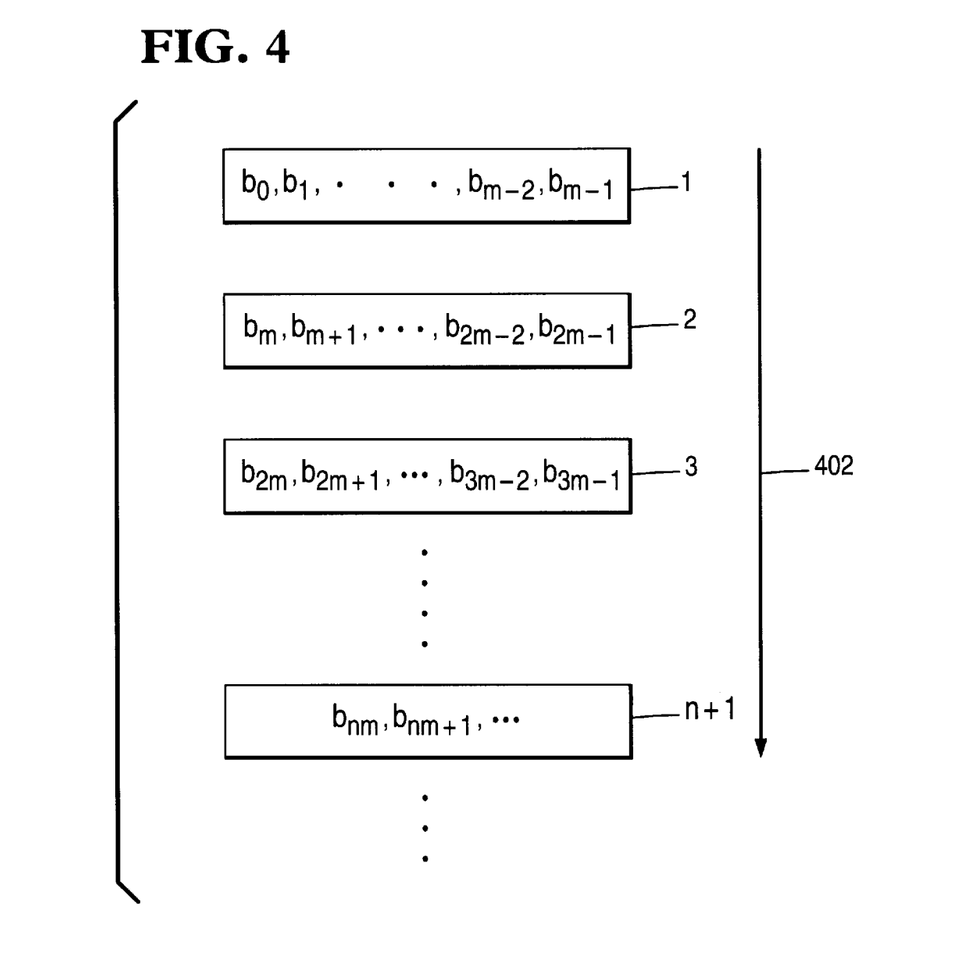
FIG. 4 is segmentation of the test message shown in FIG. 3, in accordance with the present invention.

Referring to FIG. 4, there is shown segmentation of the test message shown in FIG. 3, in accordance with the present invention. As shown in FIG. 4, each of the segments contains m bytes. Each of the segments has an associated sequence number (1, 2, . . . , n+1), indicating transmitting order ascending from lower number of segments to higher number of segments.

Figure 5:
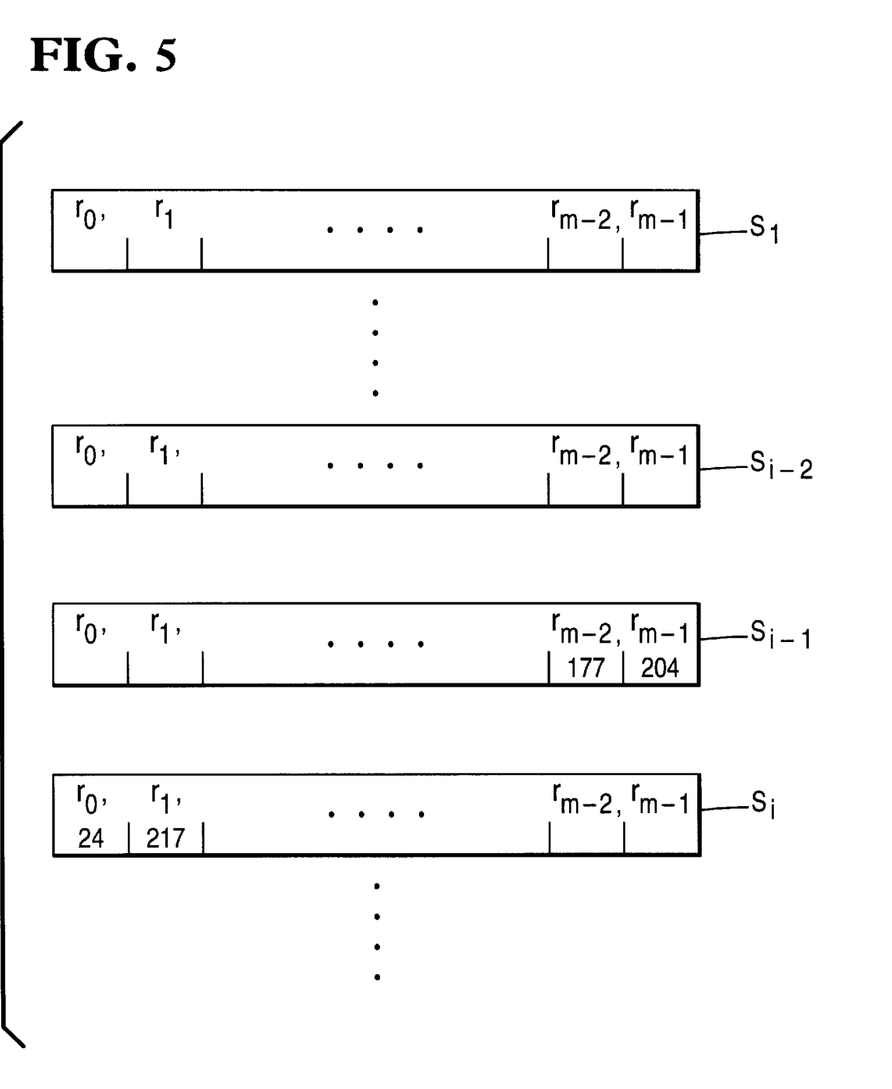
FIG. 5 shows the segments ($S_1, \ldots, S_{i-2}, S_{i-1}, S_i, \ldots$) received and re-sequenced by a receiving terminal, in accordance with the present invention.

Referring to FIG. 5, there is shown the segments ($S_1, S_{i-2}, S_{i-1}$, and $S_i, \ldots$) received and re-sequenced by a receiving terminal, in accordance with the present invention. Each of the received segments contains m bytes. These segments can be stored in memory storage 202 or buffer memory 222 in network interface 220 as shown in FIG. 2. The subscripts of the segments (1, . . . , i–2, i–1, and i) indicate the sequence order at the receiving terminal. The subscripts of one byte (0, 1, . . . , m–2, m–1) indicate the byte order received. As shown in FIG. 5, the values of the last two received bytes ($r_{m-2}$, $r_{m-1}$) in $S_{i-1}$ are 177 and 204 respectively; the values of the first two received bytes ($r_0$, $r_1$) in $S_i$ are 24 and 217 respectively.

Figure 6:
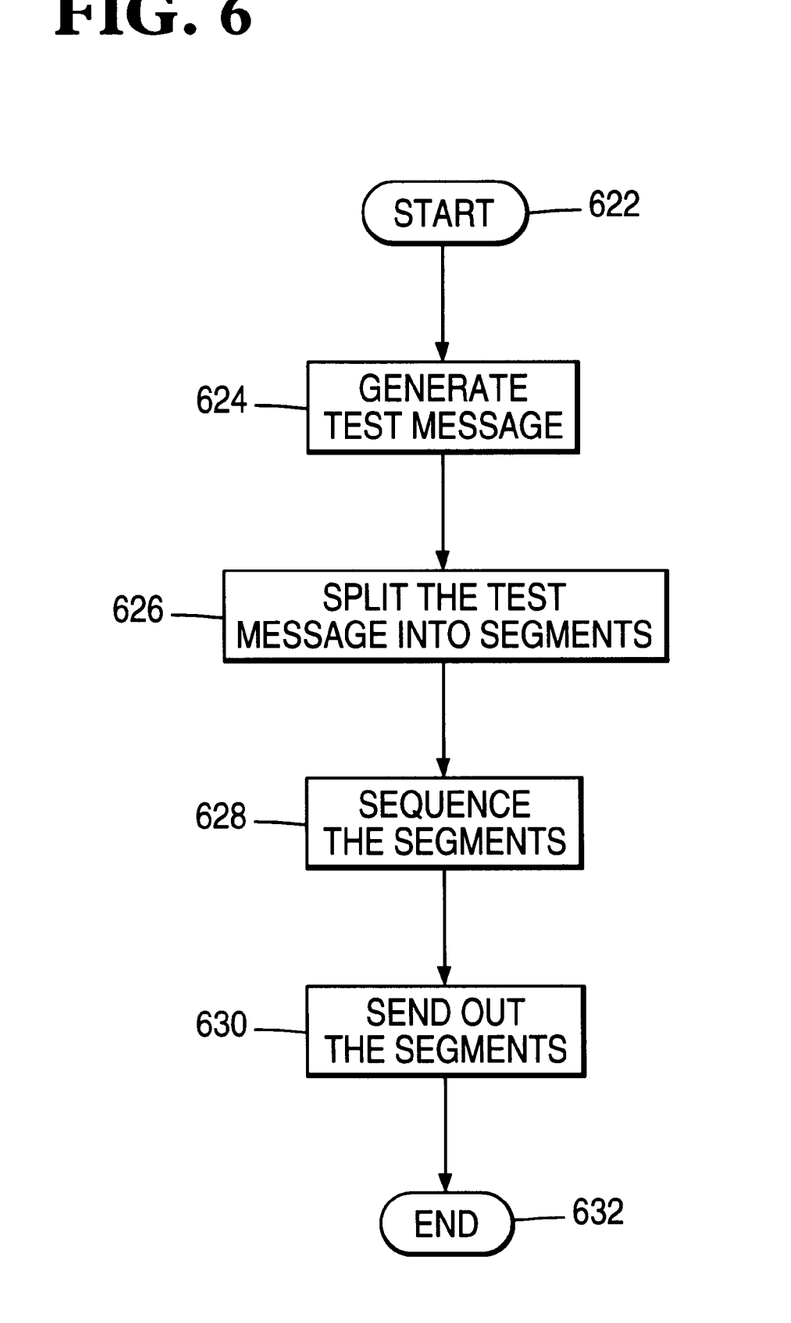
FIG. 6 is the flowchart illustrating the steps of sending a test message by a transmitting terminal, in accordance with the present invention.

Referring to FIG. 6, there is shown a flowchart, illustrating the steps of sending a test message, in accordance with the present invention.

To describe the process as shown in FIG. 6, it is assumed that communication terminal 104 is used to send out a test message via communication channel 103.

In step 624, communication terminal 104 generates the test message as shown in FIG. 3 according to formula (1).

In step 626, communication terminal 104 splits the test message into many segments as shown in FIG. 4.

In step 628, communication terminal 104 assigns a sequence number to each of the segments, as shown in FIG. 4.

In step 630, communication terminal 104 sends the segments to communication network 102 via communication channel 103.

Figure 7:
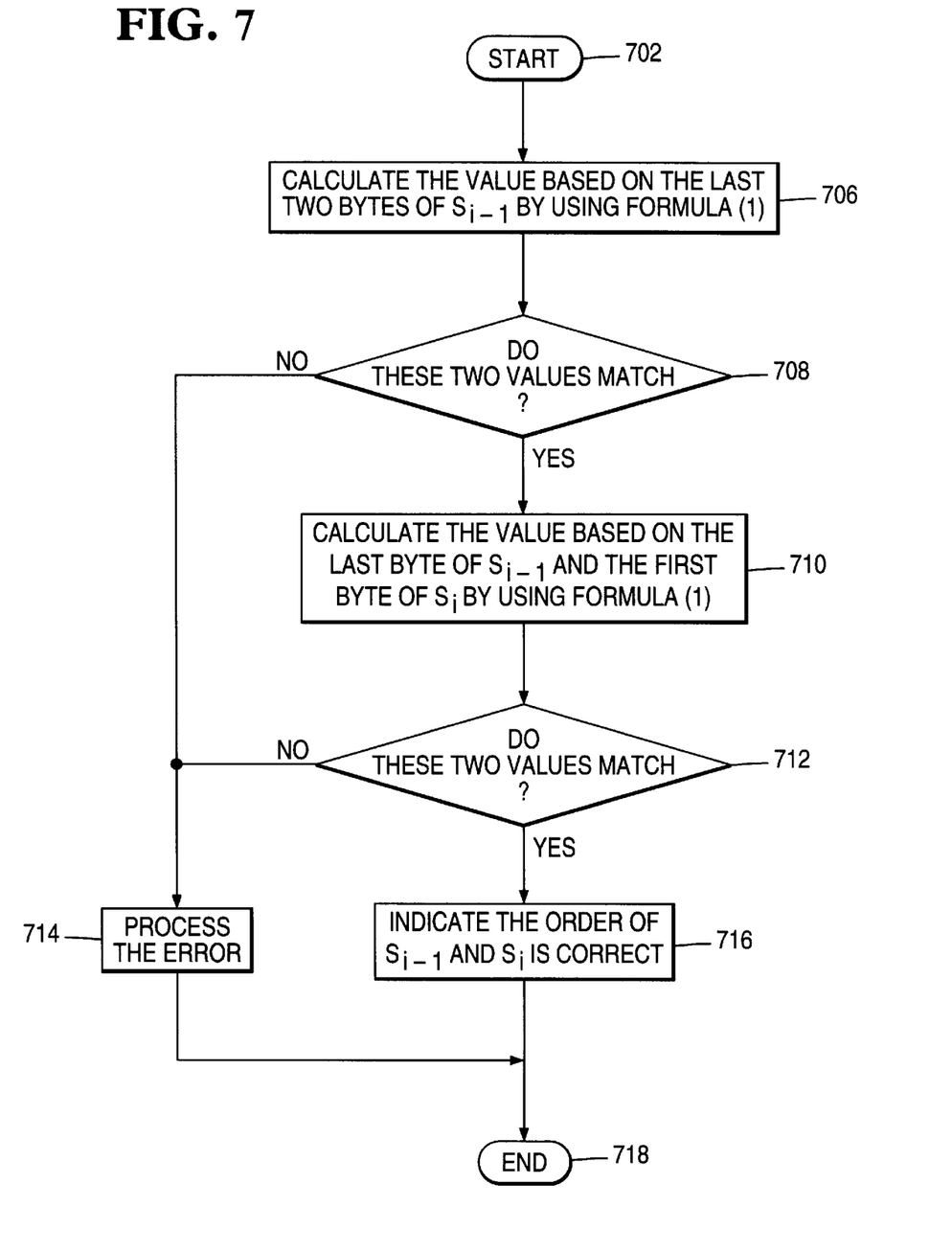
FIG. 7 is the flowchart illustrating the steps of checking the order for two segments ($S_{i-1}, S_i$) by a receiving terminal, in accordance with the present invention.

Referring to FIG. 7, there is shown a flowchart, illustrating the process of verifying the order of the ith segment $S_i$ shown in FIG. 5, in accordance with the present invention.

To describe the process as shown in FIG. 7, it is assumed that communication terminal 110 has received segments (from buffer memory 222 in network interface 220) that have been re-sequenced, and stored the re-sequenced segments in its respective memory storage 204.

In step 706, receiving terminal 110 calculates the value based on the values of the last two bytes in $S_{i-1}$, by using formula (1) discussed above. In this particular instance, the values of the last two bytes in $S_{i-1}$, are 177 and 204 respectively. Let $b_{n-1}$=177 and $b_n$=204, then f (177, 204)= 24.

In step 708, the receiving terminal compares the calculated value with the value of the first byte in $S_i$, to determine whether the calculated value matches the value of the first byte in $S_i$. If the calculated value did not match the value of the first byte in $S_i$, the receiving terminal would direct the operation to step 714 to process the error.

In step 708, if calculated value matches the value of the first byte in $S_i$, the receiving terminal directs the operation to step 710 to check the second byte in $S_i$. Since, in this particular instance, the calculated value (24) matches the value of the first byte in $S_i$, the operation is led to step 710.

In step 710, receiving terminal 110 calculates the value based on the values of the last byte in $S_{i-1}$, and the first byte in $S_i$ by using formula (1). In this particular instance, the value of the last byte in $S_{i-1}$, and the value of the first byte are 204 and 24 respectively. Let $b_{n-1}$=204 and bn=24, then f (204, 24)=217.

In step 712, the receiving terminal compares the calculated value with the value of the second byte in $S_i$, to determine whether the calculated value matches the value of the second byte in $S_i$. If the calculated value did not match the value of the second byte in $S_i$, the receiving terminal would direct the operation to step 714 to process the error.

In step 712, if the calculated value matches the value of the second byte in $S_i$, the receiving terminal directs the operation to step 716. Since, in this particular instance, the calculated value (217) matches the value of the second byte in $S_i$, the operation is led to step 716.

After successfully checking the first two bytes in $S_i$ against the last two bytes in $S_{i-1}$, in step 716, the receiving terminal can also determine that at least the end portion of the data in $S_{i-1}$, and its length, are correct.

By successfully checking the first two bytes in $S_i$ against the last two bytes in $S_{i-1}$, in step 716, the receiving terminal can also determine that at least the end portion of the data in $S_{i-1}$, and its length, are correct.

All other received segments can be checked by using the same process shown in FIG. 7.

In the present invention, the program that performs the steps shown in FIG. 6 is preferably stored in memory storage 204 at a transmitting terminal. The program that performs the steps shown in FIG. 7 is preferably stored in memory storage 204 at a receiving terminal.

From the descriptions above, it can be appreciated that the present invention has the following features and advantages:

1. A test message contains a non-repeating data pattern in which any small portion of a known length is sufficient to generate the remainder of the message.
2. To verify the correct order for a segment received from a communication channel, a receiving terminal does not need to check the entire contents of the segment.
3. Segment order and continuity, which have been the highest chance of error, can be checked at higher efficiency. It is unnecessary to check all data.
4. The higher-efficiency procedure, checking only the beginning and end portions of segments, detects error in a variety of common cases, including omission, addition, repetition, changes in length, or partial mis-ordering of segments.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. An apparatus for transmitting a message from a transmitting terminal to a receiving terminal, comprising:

a processor logic associated with the transmitting terminal and operable to generate the message to contain a plurality of data units such that each data unit of the message which follows a particular data unit of the message is reconstructible from said particular data unit during a message verification process of the receiving terminal; and a transmitter circuit in communication with the transmitting terminal and the receiving terminal operable to transmit the message.

2. The apparatus of claim 1, wherein said processor logic is operable to generate said plurality of data units of said message based upon a predetermined formula.

3. The apparatus of claim 2, wherein the message contains a plurality of bytes, each of said data units contains two bytes, and said predetermined formula is:

$$b_{n+1} = b_{n-1} + \frac{b_n}{2} + 1,$$

$$n = 1, 2, \ldots, L;$$

wherein $b_i$ stands for the ith byte in the message;

wherein $b_0$ and $b_1$ are pre-selected;

wherein n=1, 2, ..., L;

wherein L+1 is the total number of bytes in the message.

4. The apparatus of claim 1, wherein:

said processor logic is further operable to divide the message into a plurality of segments; and said transmitter circuit is further operable to transmit the message segment-by-segment.

5. The apparatus of claim 1, wherein:

said processor logic is operable to generate first data unit of said plurality of data units based on a second data unit of said plurality of data units which precedes said first data unit.

6. The apparatus of claim 1, wherein:

said processing logic is further operable to generate said message such that said plurality of data units form a non-repeating sequence of data units.

7. The apparatus of claim 1, wherein:

said processing logic is further operable to generate said message such that each data unit of said plurality of data units is different.

8. An apparatus for receiving a message containing a plurality of segments and verifying the sequence of the plurality of segments, each of the segments containing a plurality of data units, the apparatus comprising:

a receiver circuit operable to (i) receive the message containing the plurality of segments, and (ii) reconstruct the message by placing the plurality of segments in sequence order; and a processor logic operable to (i) generate an expected portion for a first segment of the message based upon a particular data unit of the message, and (ii) verify the sequence of the first segment by checking only a portion of the first segment against said expected portion for the first segment.

9. The apparatus of claim 8, wherein:

said portion corresponds to a beginning portion of the first segment, said particular data unit corresponds to an end portion of a second segment of said message which precedes the first segment, and said processor logic is further operable to generate said expected portion from said particular data unit in accordance with a predetermined formula.

10. The apparatus of claim 8, wherein:

said processing logic is further operable to generate said expected portion for the first segment based on a predetermined formula.

11. The apparatus of claim 10, wherein the message contains a plurality of bytes, each of said data units contains two bytes, and said predetermined formula is:

$$b_{n+1} = b_{n-1} + \frac{b_n}{2} + 1,$$
$$n = 1, 2, \ldots, L;$$

wherein $b_i$ stands for the ith byte in the message;

wherein $b_0$ and $b_1$ are pre-selected;

wherein n=1, 2, ..., L;

wherein L+1 is the total number of bytes in the message.

12. A system for verifying the sequence of a message containing a plurality of segments, each of the plurality of segments containing a plurality of data units, the system comprising:

a first processor logic operable to generate the message such that each data unit of the message which follows a particular data unit of the message is reconstructible from said particular data unit; and a second processor logic operable to (i) generate an expected portion for a first segment of the message based upon a particular data unit of the message, and (ii) verify the sequence of said first segment by checking only a portion of said first segment against said expected portion for said first segment.

13. The system of claim 12, wherein:

said second processing logic is further operable to generate said expected portion for the first segment based on a predetermined formula.

14. The system of claim 13, wherein the message contains a plurality of bytes, each of said data units contains two bytes, and said predetermined formula is:

$$b_{n+1} = b_{n-1} + \frac{b_n}{2} + 1,$$
$$n = 1, 2, \ldots, L;$$

wherein $b_i$ stands for the ith byte in the message;

wherein $b_0$ and $b_1$ are pre-selected;

wherein n=1, 2, ..., L;

wherein L+1 is the total number of bytes in the message.

15. The system of claim 12, wherein:

said first processing logic is further operable to generate said message such that said plurality of data units form a non-repeating sequence of data units.

16. The system of claim 12, wherein:

said first processing logic is further operable to generate said message such that each data unit of said plurality of data units is different.

* * * * *